(12) United States Patent
Paunov et al.

(10) Patent No.: US 9,987,995 B2
(45) Date of Patent: Jun. 5, 2018

(54) LADDER STORING AND RELEASING ASSEMBLY

(71) Applicant: RANGER DESIGN, Baie-d'Urfé (CA)

(72) Inventors: Ilko Paunov, Laval (CA); Alain Pepin, Ile Bizard (CA)

(73) Assignee: Ranger Design, Quebec (CA)

( * ) Notice: Subject to any disclaimer, the term of this patent is extended or adjusted under 35 U.S.C. 154(b) by 168 days.

(21) Appl. No.: 15/002,776

(22) Filed: Jan. 21, 2016

(65) Prior Publication Data

US 2016/0207471 A1 Jul. 21, 2016

Related U.S. Application Data

(60) Provisional application No. 62/105,776, filed on Jan. 21, 2015.

(51) Int. Cl.
*B60R 9/048* (2006.01)
*B60R 9/042* (2006.01)

(52) U.S. Cl.
CPC ................ *B60R 9/0423* (2013.01)

(58) Field of Classification Search
CPC ............. B60R 9/048; B60R 9/0423
USPC ............. 224/310, 311, 315, 321, 324, 325
See application file for complete search history.

(56) References Cited

U.S. PATENT DOCUMENTS

| | | | |
|---|---|---|---|
| 3,013,681 A | 12/1961 | Garnett | |
| 3,058,607 A * | 10/1962 | Kiley | E06C 5/24 414/462 |
| 3,643,292 A | 2/1972 | Kim | |
| 3,809,425 A * | 5/1974 | Blaschke | B60P 3/38 135/904 |
| 3,849,834 A | 11/1974 | Mayer | |
| 3,963,136 A * | 6/1976 | Spanke | B60R 9/0423 224/310 |
| 4,339,223 A * | 7/1982 | Golze | B60R 9/042 180/271 |
| 4,350,471 A * | 9/1982 | Lehmann | B60R 9/042 224/310 |
| 4,618,083 A | 10/1986 | Weger, Jr. | |
| 4,826,387 A | 5/1989 | Audet | |
| 4,887,750 A * | 12/1989 | Dainty | B60R 9/0423 182/127 |
| 5,058,791 A | 10/1991 | Henriquez et al. | |
| 5,104,280 A * | 4/1992 | Ziaylek | B60R 9/0423 280/4 |

(Continued)

FOREIGN PATENT DOCUMENTS

FR 2680736 A1 3/1993

*Primary Examiner* — Brian D Nash
(74) *Attorney, Agent, or Firm* — William H. Honaker; Dickinson Wright PLLC

(57) ABSTRACT

An assembly for a storing and releasing a ladder comprising an outer lock that includes outer base extending along an axis and a pole extending transversely from the outer base to a pole end for disposition in a parallel and spaced relationship to the first drop-down arm in the cradle position for preventing the rail of the ladder from falling off the outer lock. A pole anchor connects the pole to the outer base for adjustment to various adjusted positions along the axis. A latch defines a catch for engaging the outer base in the latched position to retain the outer base in the cradle position and a locking hole for receiving a secondary lock to maintain the latch in the latched position.

20 Claims, 4 Drawing Sheets

(56) References Cited

U.S. PATENT DOCUMENTS

| | | | | |
|---|---|---|---|---|
| 5,154,563 A | * | 10/1992 | Phillips | B60R 9/0426 224/326 |
| 5,360,150 A | * | 11/1994 | Praz | B60R 9/042 224/280 |
| 5,398,778 A | * | 3/1995 | Sexton | B60R 9/0423 182/127 |
| 5,690,259 A | * | 11/1997 | Montani | B60R 9/042 224/310 |
| 5,791,857 A | * | 8/1998 | Ziaylek, Jr. | E06C 5/04 182/127 |
| 5,850,891 A | * | 12/1998 | Olms | B60R 9/0423 182/127 |
| 5,884,824 A | | 3/1999 | Spring, Jr. | |
| 6,015,074 A | * | 1/2000 | Snavely | B60R 9/042 224/310 |
| 6,092,972 A | * | 7/2000 | Levi | B60R 9/0423 224/310 |
| 6,099,231 A | * | 8/2000 | Levi | B60R 9/0423 224/310 |
| 6,179,543 B1 | * | 1/2001 | Adame | B60R 9/0423 224/310 |
| 6,308,874 B1 | * | 10/2001 | Kim | B60R 9/042 224/309 |
| 6,315,181 B1 | * | 11/2001 | Bradley | B60R 9/0423 224/310 |
| 6,427,889 B1 | | 9/2002 | Levi | |
| 6,520,393 B1 | * | 2/2003 | Ferguson | B60R 9/042 224/310 |
| 6,561,396 B2 | | 5/2003 | Ketterhagen | |
| 6,764,268 B2 | | 7/2004 | Levi | |
| 6,874,835 B1 | * | 4/2005 | Silverness | B60P 3/40 224/310 |
| 6,854,627 B2 | | 8/2005 | Foo et al. | |
| 6,929,162 B1 | * | 8/2005 | Jordan | B60R 9/0485 224/282 |
| 7,003,849 B2 | | 2/2006 | Cohen et al. | |
| 7,097,409 B2 | | 8/2006 | Richter | |
| 7,419,208 B2 | | 9/2008 | Mayer | |
| 7,549,831 B2 | | 7/2009 | Hendley et al. | |
| 7,992,682 B2 | * | 8/2011 | Ziaylek | B60R 9/0423 182/127 |
| 8,382,418 B2 | * | 2/2013 | DiVerdi | B60R 9/0423 187/236 |
| 8,985,933 B2 | * | 3/2015 | Ziaylek | B60R 9/0423 182/127 |
| 9,011,072 B2 | * | 4/2015 | DiVerdi | B60R 9/0423 105/29.1 |
| 2005/0236228 A1 | * | 10/2005 | Thibault | E06C 5/24 182/127 |
| 2009/0140021 A1 | | 6/2009 | Richter et al. | |
| 2013/0334267 A1 | | 12/2013 | Sautter, Jr. et al. | |
| 2015/0069101 A1 | * | 3/2015 | Presley | B60R 9/042 224/310 |

\* cited by examiner

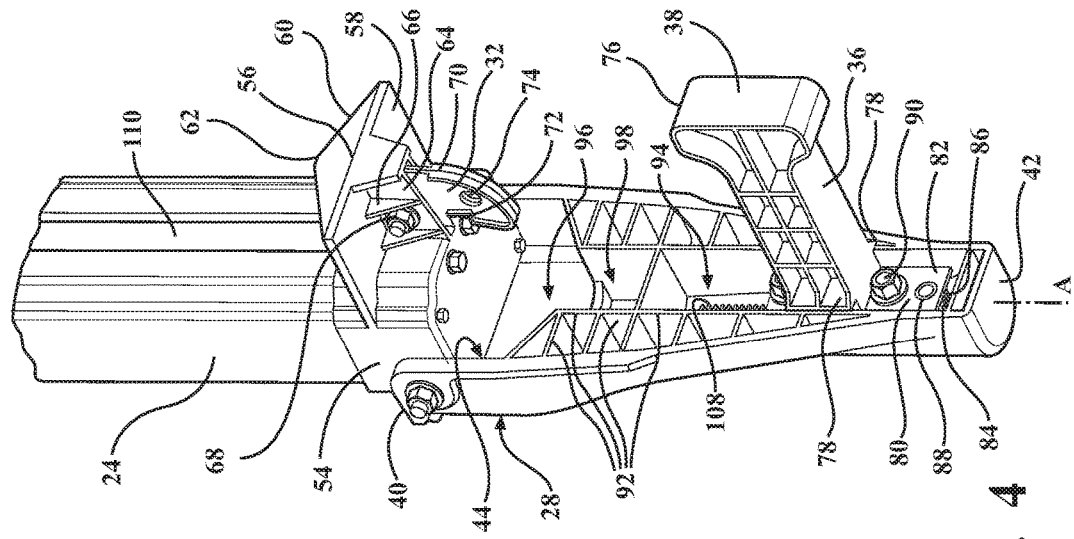
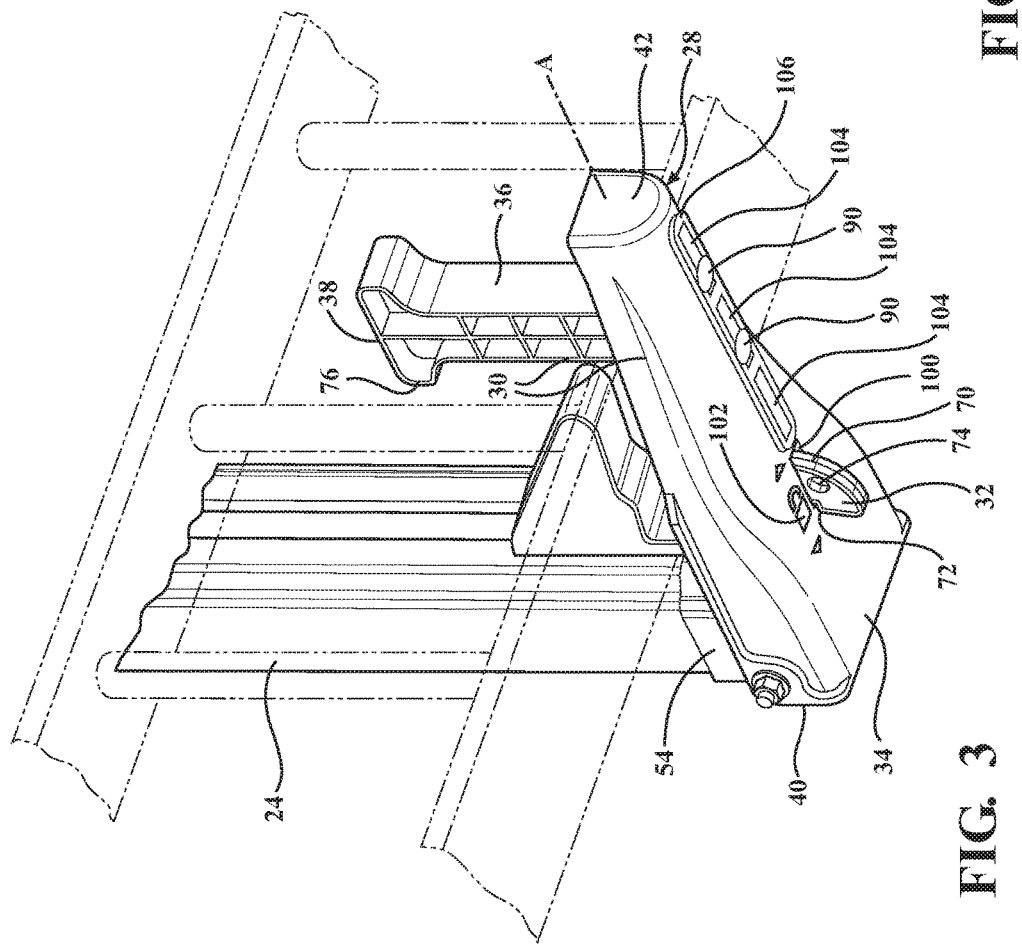

LADDER STORING AND RELEASING ASSEMBLY

CROSS-REFERENCE TO RELATED APPLICATION

This application claims the benefit of a provisional application with a Ser. No. 62/105,776 filed on Jan. 21, 2015, and entitled "A Ladder Storing and Releasing Assembly."

BACKGROUND OF THE INVENTION

1. Field of the Invention

An assembly for horizontally storing and releasing a ladder useful for loading and unloading a ladder on and off of a vehicle.

2. Description of the Prior Art

Ladder storing assemblies of the type to which the subject invention pertains are used for storing a ladder on top of a vehicle and are movable to a position on the side of the vehicle for loading and unloading the ladder. Such an assembly is illustrated in U.S. Pat. No. 3,013,681 to Garnett wherein a first drop-down arm is slidably connected to a base frame attached to the top of a vehicle for movement between a stored position on top of the vehicle and a release position on a side of the vehicle. A lower bracket extends in a perpendicular relationship with the first drop-down arm for supporting a rail of the ladder. This Garnett '681 patent and U.S. Pat. No. 7,549,831 to Renard et. al. and U.S. Pat. No. 6,427,889 to Levi disclose a lower bracket including a pole for cradling the rail of the ladder, with the pole being stationary thereby requiring lifting the rail of the ladder over the pole of the lower bracket for loading and unloading.

SUMMARY OF THE INVENTION

The invention provides such ladder storing assemblies including an outer lock rotatably connected to the first drop-down arm for movement between a cradle position in parallel and spaced relationship to the first drop-down arm for cradling the rail of the ladder against the first drop-down arm and an open position extending at a transverse angle relative to the first drop-down arm and away from the lower bracket, and a latch connected to the lower bracket for movement between a latched position engaging and retaining the outer lock in a cradle position and an unlatched position releasing the outer lock to an open position.

The invention in its broadest aspect secures the ladder in a cradled position while the assembly is moved from the stored position on the top of the vehicle to the release position on the side of the vehicle, thereby ensuring that the ladder does not fall and get damaged. Once the ladder is in the release position, the operator can move the latch to the unlatched position allowing the outer lock to pivot away from the ladder. Once the outer lock is moved from the cradle position, the operator can remove the ladder by sliding it off the inner shelf. Therefore, the operator only needs to sustain the weight of the ladder without requiring any upward lifting, providing both safety and ease of use. In addition, the outer lock is adjustable to various sizes of ladder rails and can be locked in the cradle position with a secondary lock to insure that the unattended ladder will not be stolen.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective view of the lower bracket in the cradle position.

FIG. 4 is a perspective view of the lower bracket in open position.

DESCRIPTION OF THE ENABLING EMBODIMENT

Figure 1:
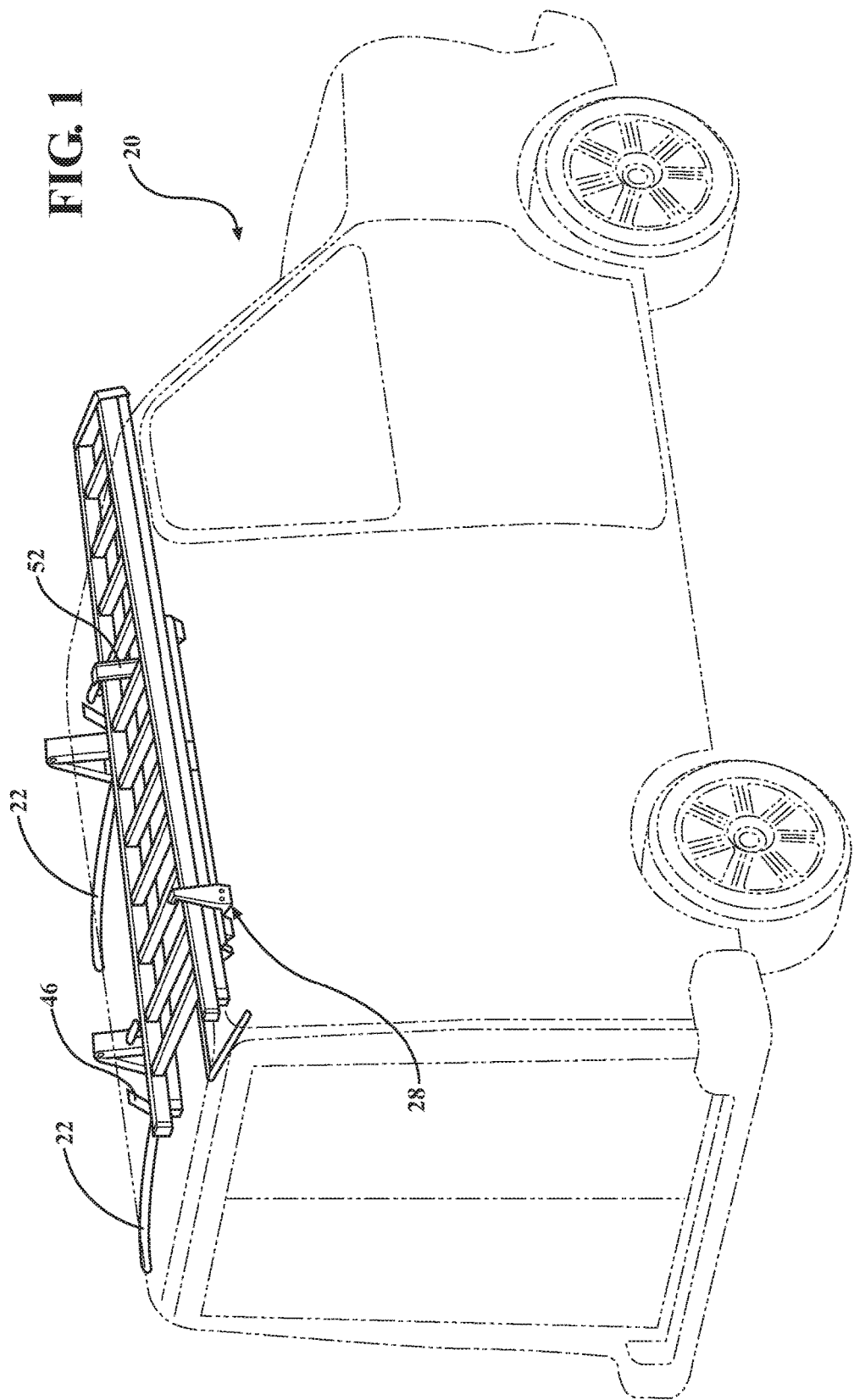
FIG. 1 is a perspective view of the ladder storing and releasing assembly in the stored position.
Figure 2:
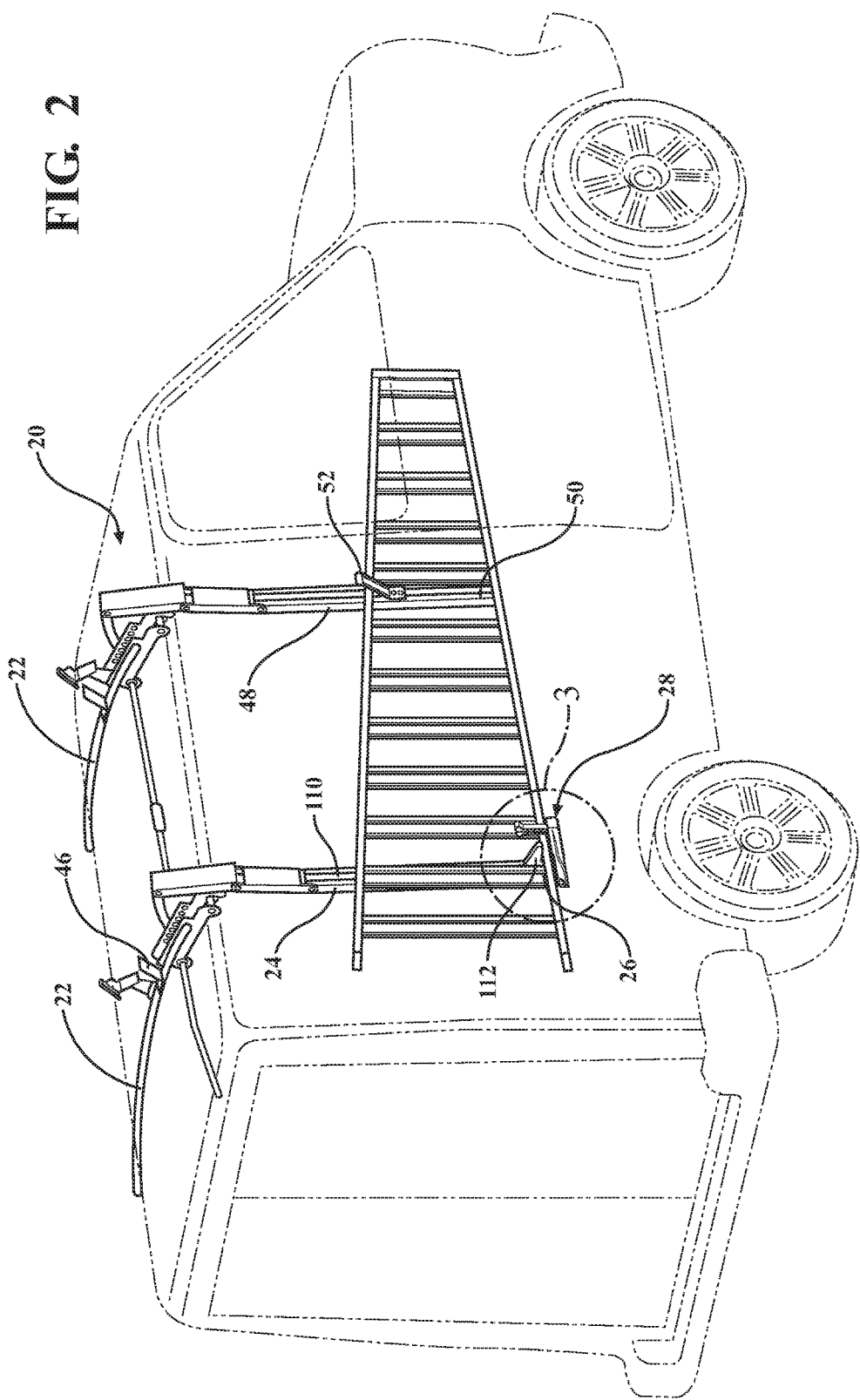
FIG. 2 is a perspective view of the ladder storing and releasing assembly in the released position.

Referring to the Figures, wherein like numerals indicate corresponding parts throughout the several views, an assembly 20 for horizontally storing and releasing a ladder constructed in accordance with the subject invention is generally shown in FIG. 1.

Figure 6:
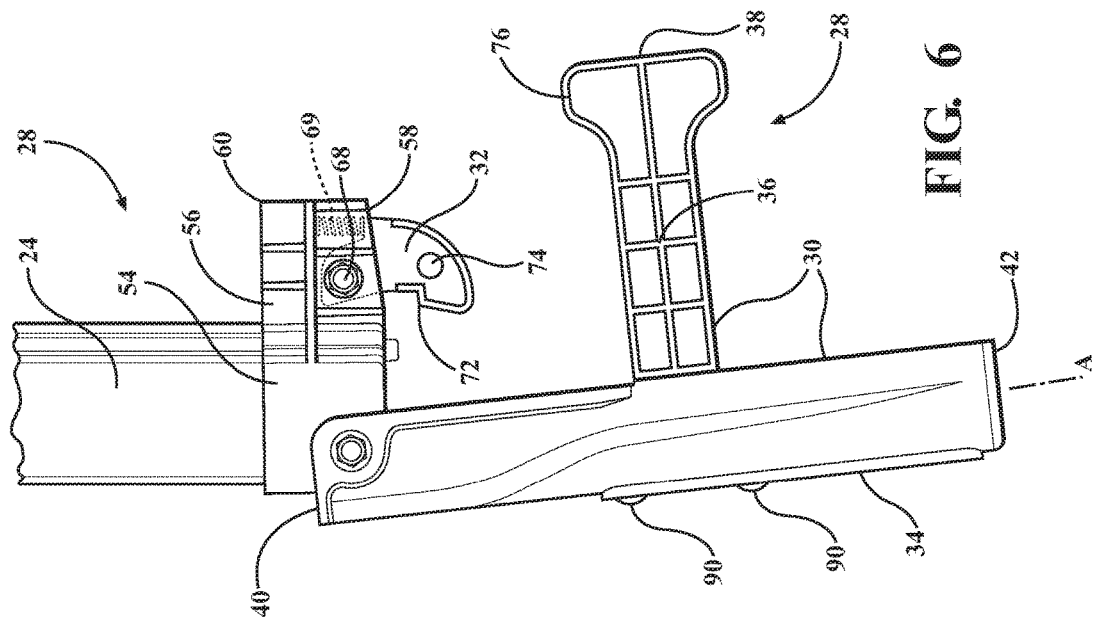
FIG. 6 is a side view of the lower bracket in the open position.
Figure 5:
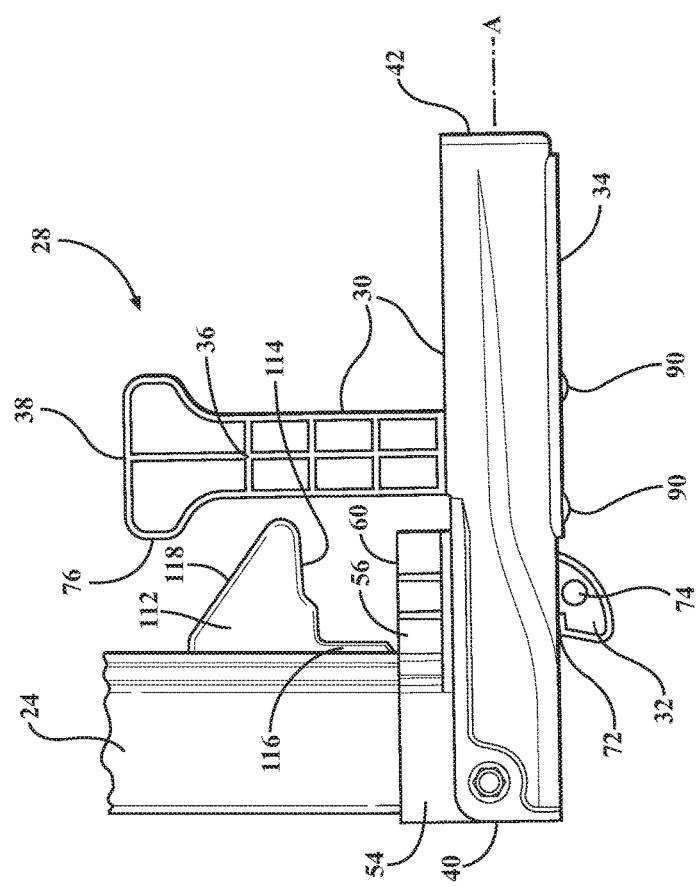
FIG. 5 is a side view of the lower bracket in the cradle position.

The assembly 20 includes a base frame 22 for attachment to the top of a vehicle that has a first drop-down arm 24 slidably connected to the base frame 22 for movement between a stored position on top of the vehicle and a release position on a side of the vehicle. The first drop-down arm 24 extends from the base frame 22 to a distal end 26 and includes a lower bracket 28 (generally indicated in FIGS. 1, 2, 3, 4 and generally shown in FIGS. 5, 6) extending from the first drop-down arm 24 for supporting a rail of the ladder.

The lower bracket 28 includes an outer lock 30 that is hook-shaped and rotatably connected to the first drop-down arm 24. The outer lock 30 is movable between a cradle position in parallel and spaced relationship to the first drop-down arm 24 for cradling the rail of the ladder against the first drop-down arm 24 and an open position extending at a transverse angle relative to the first drop-down arm 24 and away from the ladder. A latch 32 is connected to the lower bracket 28 for movement between a latched position engaging and retaining the outer lock 30 in the cradle position and an unlatched position releasing the outer lock 30 to the open position. The outer lock 30 includes an outer base 34 that extends along an axis A and a pole 36 that extends transversely from the outer base 34 to a pole end 38 for disposition in a parallel and spaced relationship to the first drop-down arm 24 in the cradle position for preventing the rail of the ladder from falling off the outer lock 30. The outer base 34 tapers laterally in width along the axis A between an outer rear wall 40 having a C-shape cross section and an outer front wall 42 having a U-shape cross section to define an outer cavity 44. The pole 36 extends from the outer cavity 44 to the pole end 38.

A storage bracket 46 is disposed on the base frame 22 for retaining a opposite rail of the ladder in the stored position. In addition, there is a second drop-down arm 48 slidably connected to the base frame 22 that extends from the base frame 22 to a second distal end 50 for movement between a stored position on top of the vehicle and a release position on a side of the vehicle. A second upper bracket 52 extends from and transversely to the second drop-down arm 48 for supporting the opposite rail of the ladder.

The lower bracket 28 includes a sleeve 54 being cup-shaped disposed on the distal end 26 of the first drop-down arm 24. In addition, the lower bracket 28 includes an inner shelf 56 extending from the sleeve 54 in a transverse direction to the first drop-down arm 24 for supporting the rail of the ladder. The inner shelf 56 includes an inner bottom side 58 and an inner top side 60 spaced from the inner bottom side 58 facing the same direction as the distal end 26. The inner top side 60 defines a peak 62 that extends from the sleeve 54 for supporting the rail of the ladder.

The inner shelf 56 includes at least one sidewall 64 that extends in a parallel relationship to the axis A and defines a first hole. The sidewall 64 includes a plurality of gussets 66 of a triangular shape extending between the sidewall 64 and the inner bottom side 58 for providing reinforcement to the sidewall 64. The latch 32 defines a second hole. A first fastener 68 extends through the first hole of the sidewall 64 and the second hole of the latch 32 for rotatably connecting the latch 32 with the sidewall 64. The latch 32 is biased in the latched position by a spring 69 and defines a rounded profile and a lip 70 that extends laterally from the latch 32 for manually grasping the lip 70 to release the latch 32 from the latched position. In addition, the latch 32 defines a catch 72 for engaging the outer lock 30 in the latched position to retain the outer lock 30 in the cradle position. Furthermore, the latch 32 defines a locking hole 74 for receiving a secondary lock to maintain the latch 32 in the latched position. A few examples of the secondary lock could be bolts, fasteners, or even padlocks for preventing theft.

A flare 76 extends laterally from the pole end 38 for retaining the rail of the ladder in a cradled position. A pair of feet 78 extends from the pole 36 in a direction perpendicular to the axis A for engaging the outer base 34 and stabilizing the pole 36. A pole anchor 80 connects the pole 36 to the outer base 34 for adjustment to various adjusted positions along the axis A. The pole anchor 80 includes a top panel 82 and a bottom panel 84 extending in a parallel and spaced apart relationship and a pair of middle panels 86 extending in a parallel relationship and being spaced apart from one another and interconnecting the top panel 82 and the bottom panel 84. The pole anchor 80 defines a plurality of anchor holes 88 extending to the outer base 34 of the outer lock 30. A plurality of second fasteners 90 extends through the anchor holes 88 of the pole anchor 80 for connecting the pole anchor 80 to the outer base 34 of the outer lock 30 for adjusting the position of the pole anchor 80 along the axis A.

A plurality of webs 92 are disposed in the outer cavity 44 and define a first compartment 94 for receiving the pole anchor 80, a second compartment 96 for receiving the sleeve 54, and a third compartment 98 for receiving the sidewall 64 and the latch 32 with each of the compartments 94, 96, 98 aligned serially along the axis A. The third compartment 98 defines a slot 100 of a rectangular shape through the outer base 34 of the outer lock 30 for receiving the latch 32. An indicia 102 of a padlock shape extends beside the slot 100 for identifying the latched position. The outer base 34 defines a plurality of openings 104 of a rectangular shape that extend along the axis A into the first compartment 94 for receiving the second fasteners 90 from the pole anchor 80. An embossment 106 extends perpendicularly from the outer base 34 of the outer lock 30 around each of the openings 104 for providing structural support to the second fasteners 90 that extend through the pole anchor 80. A plurality of guides 108 extend from the webs 92 into the first compartment 94 for engagement with the pole anchor 80 at one of a plurality of positions for various sized rails between the outer front wall 42 and the first drop-down arm 24.

The first drop down arm 24 further defines a track 110 that recesses into and extends transversely from the base frame 22 to the first distal end 26. A clamp 112 is slideably engaged to the track 110 for linear movement along the track 110. The clamp 112 further defines an engagement surface 114 extending in a perpendicular relationship to the first drop down arm 24 that faces the distal end 26. The engagement surface 114 defines a step 116 having an L-shape for clenching the rail of a ladder and spacing the rail of the ladder from the first drop down arm 24. The clamp 112 further defines a screw hole 118 for engaging a screw to lock the clamp 112 into a stationary position along the track 110.

Obviously, many modifications and variations of the present invention are possible in light of the above teachings and may be practiced otherwise than as specifically described while within the scope of the appended claims. Antecedent recitations should be interpreted to cover any combination in which the inventive novelty exercises its utility. The use of the word "the" in the assembly claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An assembly for a storing and releasing a ladder comprising;
    a base frame mountable to the top of a vehicle such that movement between the top of the vehicle and said base frame is prevented,
    a first drop-down arm slidably connected to said base frame for movement between a stored position on top of the vehicle and a release position on a side of the vehicle and extending from said base frame to a distal end,
    a lower bracket extending from said first drop-down arm for supporting a rail of the ladder,
    an outer lock rotatably connected to said first drop-down arm for movement between a cradle position in parallel and spaced relationship to said first drop-down arm for cradling the rail of the ladder against said first drop-down arm and an open position allowing rotational movement of said outer lock towards a perpendicular and spaced relationship to said first drop-down arm and away from the ladder.

2. An assembly as set forth in claim 1 wherein said outer lock includes an outer base extending along an axis and a pole extending transversely from said outer base to a pole end for disposition in a parallel and spaced relationship to said first drop-down arm in the cradle position for preventing the rail of the ladder from falling off said outer lock.

3. An assembly as set forth in claim 2 wherein said pole includes a flare extending laterally from said pole end for preventing upward movement of the rail of the ladder in the cradled position.

4. An assembly as set forth in claim 2 including a pole anchor connecting said pole to said outer base for adjustment to various adjusted positions along said axis.

5. An assembly as set forth in claim 1 including a latch connected to said lower bracket for movement between a latched position engaging and retaining said outer lock in the cradle position and an unlatched position releasing said outer lock to the open position.

6. An assembly as set forth in claim 5 wherein said outer lock includes a slot for receiving said latch.

7. An assembly as set forth in claim 5 wherein said latch is rotatably connected to said lower bracket.

8. An assembly as set forth in claim 7 wherein said lower bracket includes at least one sidewall extending in a parallel relationship to said axis and defining a first hole.

9. An assembly as set forth in claim 8 wherein said latch defining a second hole and a first fastener extending through said first hole of said sidewall and said second hole of said latch for rotatably connecting said latch with said sidewall.

10. An assembly as set forth in claim 5 further including said latch defining a catch for engaging said outer lock in the latched position to retain said outer base in the cradle position.

11. An assembly as set forth in claim 5 further including said latch defining a locking hole for receiving a secondary lock to maintain said latch in the latched position.

12. An assembly as set forth in claim 1 wherein said first drop down arm defines a track that recesses into and extends transversely along said first drop down arm where a clamp defining an engagement surface with a step is slideably engaged to said track for linear movement along the track for clenching the ladder in a spaced relationship from said first drop down arm.

13. An assembly for a storing and releasing a ladder comprising;
  a base frame mountable to the top of a vehicle such that movement between the top of the vehicle and said base frame is prevented,
  a first drop-down arm slidably connected to said base frame for movement between a stored position on top of the vehicle and a release position on a side of the vehicle and extending from said base frame to a distal end,
  an inner shelf extending from said first drop-down arm for supporting a rail of the ladder,
  an outer lock being hook shaped and rotatably connected to said first drop-down arm for movement between a cradle position extending adjacent to the rail of the ladder for engaging and retaining the rail of the ladder and an open position extending away from the ladder.

14. An assembly set forth in claim 13 further including a second drop-down arm slidably connected to said base frame and extending from said base frame to a second distal end for movement between a stored position on top of the vehicle and a release position on a side of the vehicle.

15. An assembly set forth in claim 14 wherein a second upper bracket extends transversely from said second drop-down arm for supporting the opposite rail of the ladder.

16. An assembly set forth in claim 13 wherein said outer lock includes an outer base extending along an axis and a pole extending transversely from said outer base to a pole end for disposition in a parallel and spaced relationship to said first drop-down arm in the cradle position for preventing the rail of the ladder from falling off said outer lock.

17. An assembly as set forth in claim 16 wherein said pole includes a flare extending laterally from said pole end for preventing upward movement of the rail of the ladder in the cradled position.

18. An assembly as set forth in claim 16 including a pole anchor connecting said pole to said outer base for adjustment to various adjusted positions along said axis.

19. An assembly as set forth in claim 13 including a latch connected to said lower bracket for movement between a latched position engaging and retaining said outer lock in the cradle position and an unlatched position releasing said outer lock to the open position.

20. An assembly as set forth in claim 13 wherein said first drop down arm defines a track that recesses into and extends transversely along said first drop down arm where a clamp defining an engagement surface with a step is slideably engaged to said track for linear movement along the track for clenching the ladder in a spaced relationship from said first drop down arm.

* * * * *